(12) United States Patent
Chou et al.

(10) Patent No.: US 9,118,249 B2
(45) Date of Patent: Aug. 25, 2015

(54) POWER CONVERSION APPARATUS

(75) Inventors: Hung-Che Chou, Hsinchu County (TW); Pao-Chuan Lin, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 342 days.

(21) Appl. No.: 13/559,611

(22) Filed: Jul. 27, 2012

(65) Prior Publication Data

US 2014/0029310 A1    Jan. 30, 2014

(51) Int. Cl.
| | | |
|---|---|---|
| G05F 3/24 | (2006.01) | |
| G05F 1/573 | (2006.01) | |
| H02M 3/156 | (2006.01) | |
| H02M 3/335 | (2006.01) | |
| H02M 1/32 | (2007.01) | |

(52) U.S. Cl.
CPC .... *H02M 3/33507* (2013.01); *H02M 2001/327* (2013.01)

(58) Field of Classification Search
CPC ................... H02M 3/33507; H02M 2001/327; H02M 3/335
USPC .................................. 323/265, 276, 282, 285
See application file for complete search history.

(56) References Cited

U.S. PATENT DOCUMENTS

| | | | |
|---|---|---|---|
| 6,819,091 B2 * | 11/2004 | Ishihara et al. | 323/285 |
| 7,149,098 B1 * | 12/2006 | Chen | 363/56.09 |
| 7,274,174 B2 * | 9/2007 | Wang et al. | 323/224 |
| 7,315,190 B1 | 1/2008 | Chen | |
| 7,872,428 B1 | 1/2011 | Papanicolaou | |
| RE42,307 E * | 4/2011 | Walters et al. | 323/277 |
| 2005/0168203 A1 * | 8/2005 | Dwarakanath et al. | 323/282 |
| 2012/0170330 A1 * | 7/2012 | Yang et al. | 363/21.13 |

FOREIGN PATENT DOCUMENTS

| | | |
|---|---|---|
| CN | 101807105 | 8/2010 |
| CN | 102014540 | 4/2011 |
| CN | 102076149 | 5/2011 |
| CN | 102263492 | 11/2011 |
| CN | 202261964 | 5/2012 |
| CN | 102523650 | 6/2012 |
| CN | 102523661 | 6/2012 |

(Continued)

OTHER PUBLICATIONS

"Office Action of Taiwan Counterpart Application", issued on Sep. 5, 2014, p. 1-p. 3.

(Continued)

*Primary Examiner* — Timothy J Dole
*Assistant Examiner* — Sisay G Tiku
(74) *Attorney, Agent, or Firm* — Jianq Chyun IP Office

(57) ABSTRACT

A power conversion apparatus is disclosed. The power conversion apparatus includes a power transistor, a thermal resistor and a temperature detection circuit. A control terminal of the power transistor receives a control signal. The power transistor converts an input voltage into an output voltage according to the control signal. The thermal resistor has a negative temperature coefficient. The temperature detection circuit generates the control signal and provides a driving current to the control terminal of the power transistor according to the control signal. The temperature detection circuit further generates an over temperature protection signal according to the driving current.

5 Claims, 3 Drawing Sheets

(56) References Cited

FOREIGN PATENT DOCUMENTS

| | | |
|---|---|---|
| CN | 102685975 | 9/2012 |
| CN | 103167665 | 6/2013 |
| CN | 103260301 | 8/2013 |
| CN | 103781257 | 5/2014 |
| TW | I235231 | 7/2005 |
| TW | I260476 | 8/2006 |
| TW | 201122756 | 7/2011 |
| TW | 201220660 | 5/2012 |
| WO | 0106627 | 1/2001 |
| WO | 2012078981 | 6/2012 |

OTHER PUBLICATIONS

"Office Action of China Counterpart Application", issued on May 21, 2015, p. 1-13.

* cited by examiner

POWER CONVERSION APPARATUS

BACKGROUND

1. Technical Field

The invention relates to a power conversion apparatus. Particularly, the invention relates to an over temperature protection mechanism of a power conversion apparatus.

2. Related Art

Referring to FIG. 1, FIG. 1 is a circuit diagram of a conventional power conversion apparatus 100. The power conversion apparatus 100 generates a control signal CTRL through a driver 100 according to a pulse width modulation (PWM) signal PWM. The control signal CTRL is transmitted to a gate of a power transistor PM to turn on and turn off the power transistor PM. Based on the periodic turn on and turn off operations of the power transistor PM, the power conversion apparatus 100 can convert an input voltage to generate an output voltage.

To prevent the power transistor PM or other devices that are liable to produce a high temperature from being damaged due to a high temperature, a thermal resistor RNTC can be configured beside the device to be protected, and the conventional power conversion apparatus 100 has a temperature detection circuit composed of the thermal resistor RNTC, a comparator CMP1 and a current source I1. The current source I1 provides a current to flow through the thermal resistor RNTC, and a voltage is accordingly generated at a connection terminal of the thermal resistor RNTC and the comparator CMP1. The comparator CMP1 compares the voltage and a predetermined threshold voltage Vref to determined whether an environment temperature is excessively high, so as to generate an over temperature protection signal OTP.

In case that the power conversion apparatus 100 is integrated into a chip, the power transistor PM and the thermal resistor RNTC are generally configured at external of the chip. Therefore, the conventional power conversion apparatus 100 requires two independent pins GD and OT to respectively connect the power transistor PM and the thermal resistor RNTC. In this way, a chip area is increased to increase the product cost.

SUMMARY

The invention is directed to a power conversion apparatus, which is unnecessary to add extra pins for temperature detection.

The invention provides a power conversion apparatus including a power transistor, a thermal resistor and a temperature detection circuit. The power transistor is coupled to an input voltage, and a control terminal of the power transistor receives a control signal. The power transistor converts the input voltage into an output voltage according to the control signal. The thermal resistor is connected in series between the control terminal of the power transistor and a reference ground voltage, where the thermal resistor has a negative temperature coefficient. The temperature detection circuit is coupled to the thermal resistor and the power transistor, and generates the control signal and provides a driving current to the control terminal of the power transistor according to the control signal. The temperature detection circuit further generates an over temperature protection signal according to the driving current.

In an embodiment of the invention, the temperature detection circuit includes a driver, a current detector and a comparator. The driver receives a pulse width modulation signal, and generates the control signal according to the pulse width modulation signal, and provides the driving current to the control terminal of the power transistor according to the control signal. The current detector is coupled to the driver, and generates a comparison voltage by detecting the driving current. The comparator is coupled to the current detector. The comparator receives the comparison voltage, and compares the comparison voltage with a predetermined threshold voltage to generate the over temperature protection signal.

In an embodiment of the invention, the driver includes a first transistor and a second transistor. The first transistor has a first terminal, a second terminal and a control terminal, where the first terminal receives an operation voltage, the second terminal is coupled to the control terminal of the power transistor, and the control terminal receives the pulse width modulation signal. The second transistor has a first terminal, a second terminal and a control terminal, where the second terminal receives the reference ground voltage, the first terminal is coupled to the control terminal of the power transistor, and the control terminal receives the pulse width modulation signal.

In an embodiment of the invention, the first transistor and the second transistor are not simultaneously turned on.

In an embodiment of the invention, the current detector obtains a detection current according to the driving current flowing through the first transistor. The current detector converts the detection current to generate the comparison voltage.

In an embodiment of the invention, the current detector includes a transconductance amplifier and a resistor. Two input terminals of the transconductance amplifier are respectively coupled to the first terminal and the second terminal of the first transistor, and an output terminal thereof is coupled to a terminal of the comparator that receives the comparison voltage. A first terminal of the resistor is coupled to the output terminal of the transconductance amplifier and generates the comparison voltage, and a second terminal of the resistor is coupled to the reference ground voltage.

In an embodiment of the invention, the power conversion device further includes a transformer and a rectifier. A first side winding of the transformer is coupled between the first terminal of the power transistor and the input voltage. The rectifier is coupled to the second side winding of the transformer, and rectifies a voltage on the second side winding of the transformer to generate the output voltage.

In an embodiment of the invention, the rectifier includes a diode and a capacitor. An anode of the diode is coupled to the second side winding of the transformer, and a cathode thereof generates the output voltage. A first terminal of the capacitor is coupled to the cathode of the diode, and another terminal of the capacitor is coupled to the reference ground voltage.

According to the above descriptions, by connecting the thermal resistor to the control terminal of the power transistor, and detecting a magnitude of the driving current flowing through the thermal resistor, it is determined whether an environment temperature of the power conversion apparatus is excessively high, so as to generate the over temperature protection signal. In this way, it is unnecessary to use an extra pin to connect the thermal resistor, so that when the power conversion apparatus is integrated into a chip, the required chip area can be reduced to enhance price competitiveness.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
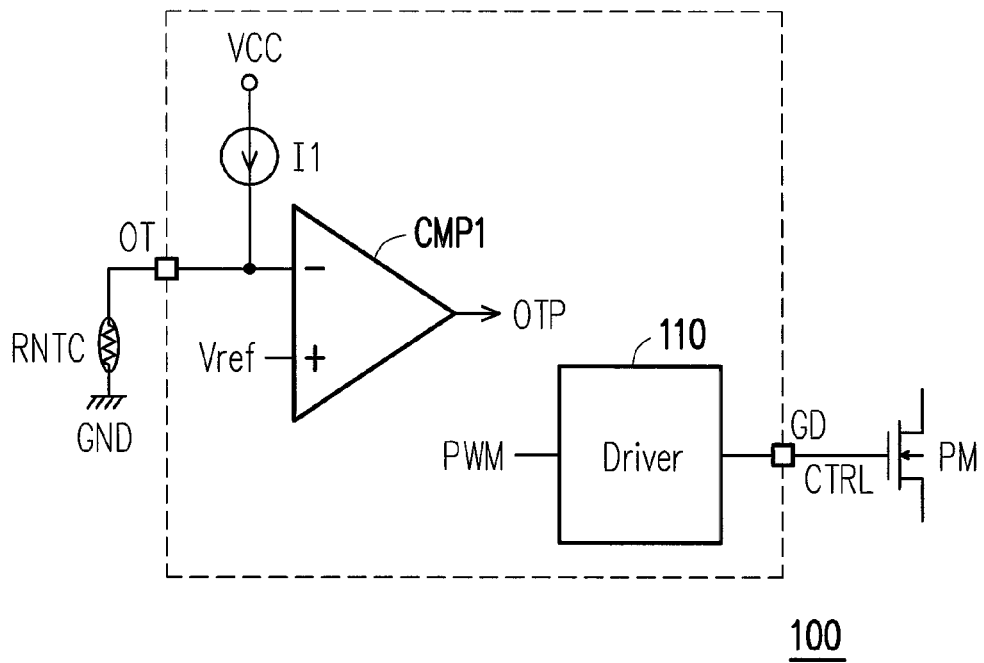
FIG. 1 is a circuit diagram of a conventional power conversion apparatus 100.
Figure 2:
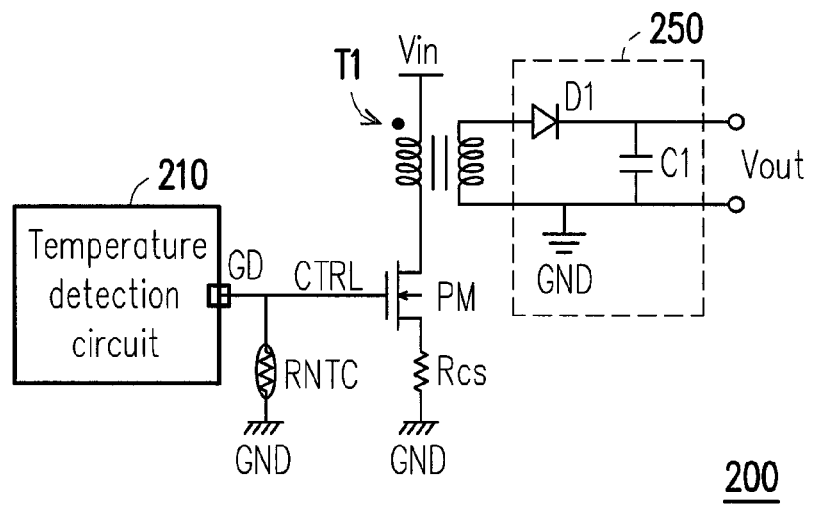
FIG. 2 is a schematic diagram of a power conversion apparatus 200 according to an embodiment of the invention.

Referring to FIG. 2, FIG. 2 is a schematic diagram of a power conversion apparatus 200 according to an embodiment of the invention. The power conversion apparatus 200 includes a power transistor PM, a thermal resistor RNTC and a temperature detection circuit 210. The power transistor PM is coupled to an input voltage Vin. A control terminal of the power transistor PM receives a control signal CTRL. The power transistor PM converts the input voltage Vin into an output voltage Vout according to the control signal CTRL. The thermal resistor RNTC is connected in series between the control terminal (for example, a gate) of the power transistor PM and a reference ground voltage GND, where the thermal resistor RNTC has a negative temperature coefficient. Namely, a resistance of the thermal resistor RNTC is inversely proportional to an environment temperature.

The temperature detection circuit 210 is coupled to the thermal resistor RNTC and the power transistor PM. The temperature detection circuit 210 generates the control signal CTRL and provides a driving current to the control terminal of the power transistor PM according to the control signal CTRL. Since the thermal resistor RNTC and the control terminal of the power transistor PM are coupled to each other, besides charging a parasitic capacitor on the control terminal of the power transistor PM, the driving current further drives the thermal resistor RNTC.

When the environment temperature of the thermal resistor RNTC increases, a resistance of the thermal resistor RNTC decreases, in this case, a current value of the driving current required for driving the thermal resistor RNTC with gradually decreased resistance is increased. Meanwhile, the temperature detection circuit 210 may learn a variation state of the resistance of the thermal resistor RNTC by detecting a magnitude of the driving current, so as to learn a variation state of the environment temperature. Namely, the temperature detection circuit 210 generates an over temperature protection signal according to the driving current.

On the other hand, the power conversion apparatus 200 further includes a transformer T1, a rectifier 250 and a resistor Rcs. A first side winding of the transformer T1 is coupled between a first terminal of the power transistor PM and the input voltage Vin, and a second side winding of the transformer T1 is coupled to the rectifier 250. When the power transistor PM is sequentially turned on and turned off according to the control signal CTRL, a voltage of the first side winding of the transformer T1 is transformed to the second side winding through voltage variation of the first side winding. The rectifier 250 receives and rectifies the voltage on the second side winding of the transformer T1 to generate the output voltage Vout.

The rectifier 250 includes a diode D1 and a capacitor C1, where an anode of the diode D1 is coupled to the second side winding of the transformer T1, a cathode of the diode D1 is coupled to one terminal of the capacitor C1, and another terminal of the capacitor C1 that is not coupled to the diode D1 is coupled to the reference ground voltage GND.

In the present embodiment, since the thermal resistor RNTC and the control terminal of the power transistor PM are coupled to a same terminal, when the power conversion apparatus 200 is integrated into a chip, only one pin GD is provided to connect the thermal resistor RNTC and the power transistor PM without providing extra pins.

Moreover, the resistor Rcs is connected in series between a second terminal of the power transistor PM and the reference ground voltage, and is used to detect a current flowing through the power transistor PM.

Figure 3:
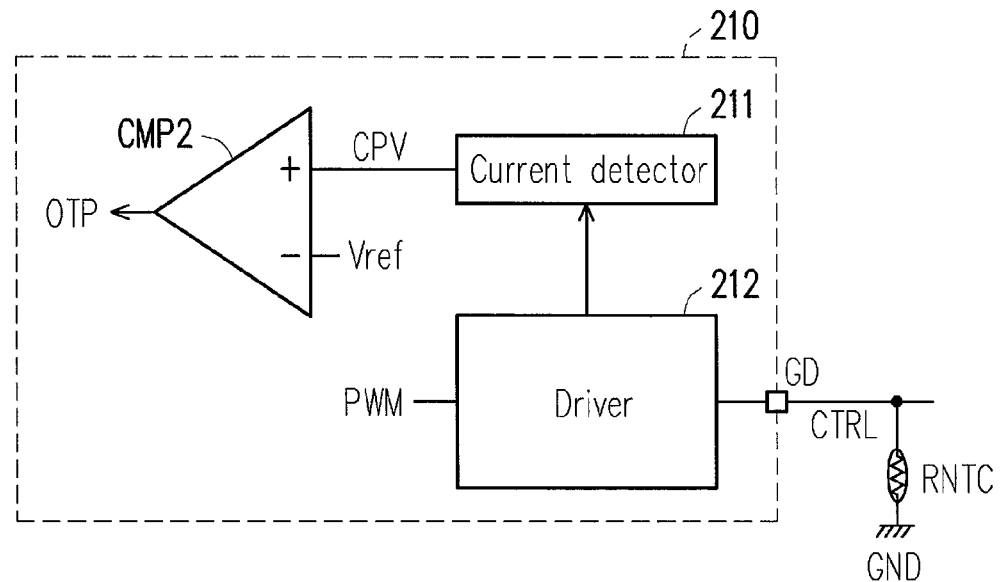
FIG. 3 is a schematic diagram of a temperature detection circuit 210 according to an embodiment of the invention.

Referring to FIG. 3, FIG. 3 is a schematic diagram of the temperature detection circuit 210 according to an embodiment of the invention. The temperature detection circuit 210 includes a current detector 211, a driver 212 and a comparator CMP2. The driver 212 is coupled to the thermal resistor RNTC through the pin GD.

The driver 212 receives a pulse width modulation (PWM) signal PWM, and generates the control signal CTRL according to the PWM signal PWM. The driver 212 provides the driving current to the control terminal of the power transistor PM through the pin GD according to the control signal CTRL.

The current detector 211 is coupled to the driver 212, and generates a comparison voltage CPV according to the driving current provided by the driver 212. The comparator CMP2 is coupled to the current detector 211, and receives the comparison voltage CPV, and the comparator CMP2 compares the comparison voltage CPV with a predetermined threshold voltage Vref to generate an over temperature protection signal OTP.

In detail, when the environment temperature increases, the resistance of the thermal resistor RNTC correspondingly decreases, and the driving current generated by the driver 212 according to the control signal CTRL that is enough to drive the thermal resistor RNTC also increases. The current detector 211 detects the gradually increased driving current, and generates the comparison voltage CPV with the gradually increased voltage value. When the comparison voltage CPV is higher than the predetermined threshold voltage Vref, the comparator CMP2 generates the over temperature protection signal OTP to notify that the power conversion apparatus 200 has a phenomenon of over temperature.

It should be noticed that when the power conversion apparatus 200 has the phenomenon of over temperature, it can temporarily stop the turn on and turn off operations of the power transistor PM (which is maintained to the turn off state), or decrease a frequency of the turn on and turn off operations of the power transistor PM, so as to suitably decrease the environment temperature.

Figure 4:
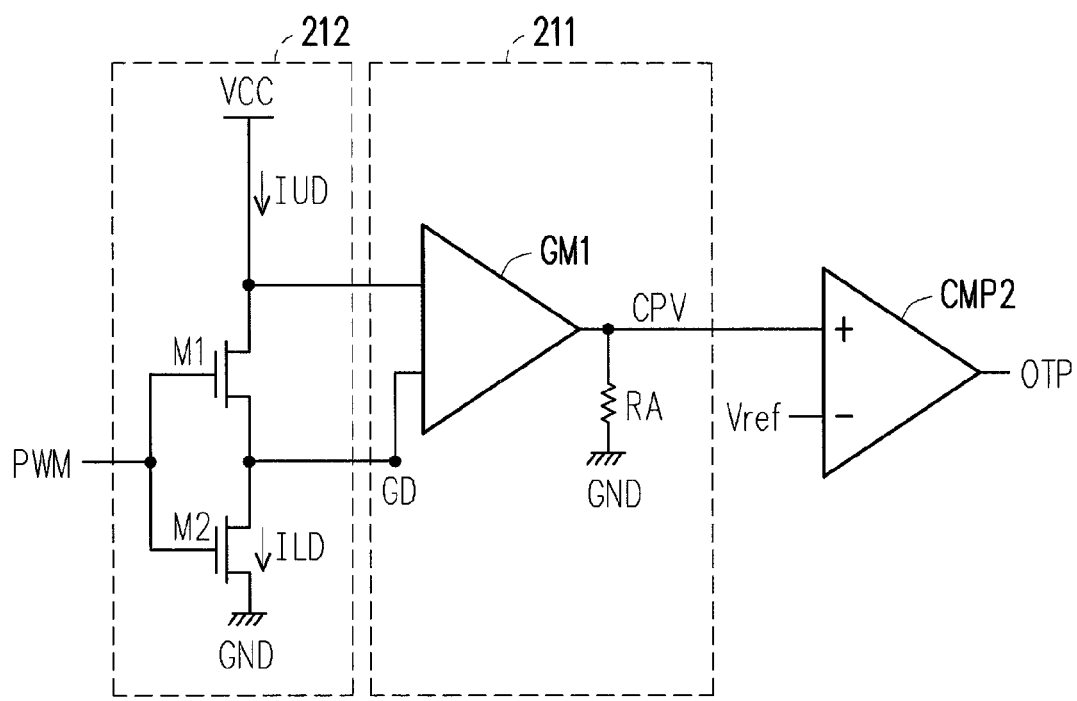
FIG. 4 is a schematic diagram of a current detector 211 and a driver 212 according to an embodiment of the invention.

Referring to FIG. 4, FIG. 4 is a schematic diagram of the current detector 211 and the driver 212 according to an embodiment of the invention. The driver 212 includes transistors M1 and M2 serving as switches. The transistor M1 has a first terminal, a second terminal and a control terminal, where the first terminal receives an operation voltage VCC, the second terminal is coupled to the control terminal of the power transistor PM, and the control terminal of the transistor M1 receives the PWM signal PWM. The transistor M2 also has a first terminal, a second terminal and a control terminal, where the second terminal of the transistor M2 receives the reference ground voltage GND, the first terminal thereof is coupled to the control terminal of the power transistor PM, and the control terminal of the transistor M2 receives the PWM signal PWM. The transistors M1 and M2 cannot be simultaneously turned on.

When the transistor M1 is turned on (the transistor is turned off), a driving current IUD is generated between the first terminal and the second terminal of the transistor M1, and the driving current IUD is provided to the pin GD. Moreover, when the transistor M2 is turned on (the transistor M1 is turned off), the first terminal of the transistor M2 drains a current ILD to the second terminal thereof.

The current detector 211 includes a transconductance amplifier GM1 and a resistor RA. Two input terminals of the transconductance amplifier GM1 are respectively coupled to the first terminal and the second terminal of the transistor M1, and an output terminal of the transconductance amplifier GM1 is coupled one terminal of the resistor RA and a negative input terminal of the comparator CMP2. Moreover, another terminal of the resistor RA that is not coupled to the transconductance amplifier GM1 is coupled to the reference ground voltage GND. When the driving current IUD flows through the first terminal and the second terminal of the transistor M1, a cross voltage on the first terminal and the second terminal of the transistor M1 is transmitted to the transconductance amplifier GM1. The transconductance amplifier GM1 generates a current according to the cross voltage on the first terminal and the second terminal of the transistor M1, and such current flows to the reference ground voltage GND through the resistor RA.

Meanwhile, the comparison voltage CPV is generated according to the current generated by the transconductance amplifier GM1 at a terminal of the resistor RA coupled to the positive input terminal of the comparator CMP2. In this way, the comparator CMP2 may compare the comparison voltage CPV and the predetermined threshold voltage Vref to generate the over temperature protection signal OTP.

Figure 5:
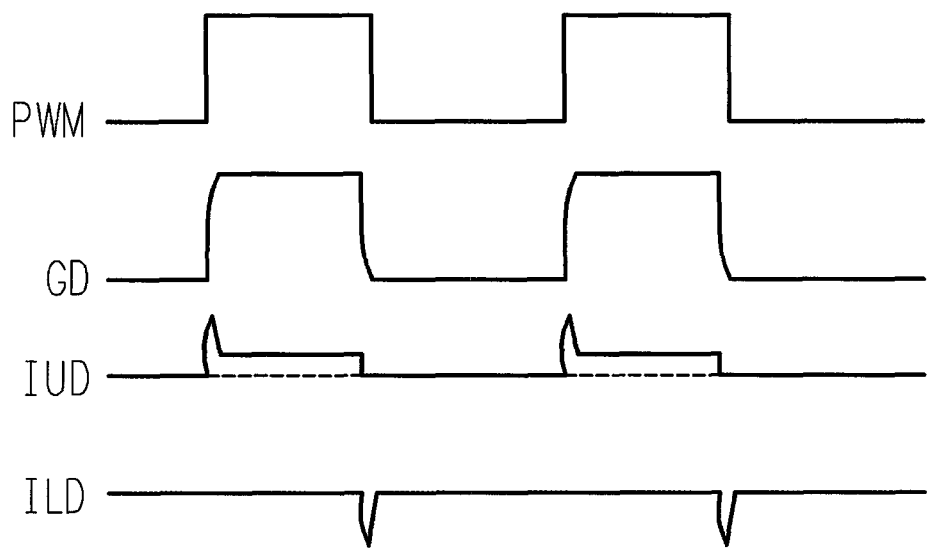
FIG. 5 is a waveform diagram according to an embodiment of the invention.

Referring to FIG. 5, FIG. 5 is a waveform diagram according to an embodiment of the invention. When the PWM signal PWM is transited from a low voltage level to a high voltage level, the voltage on the pin GD is correspondingly pulled high. At a moment when the PWM signal PWM is transited from the low voltage level to the high voltage level, the driving current IUD provided by the driver 212 is instantly pulled high, and then drops to a stable current level. Now, in case that the driving current IUD is stably produced, the comparator compares the comparison voltage generated according to the driving current IUD and the predetermined threshold voltage to generate the over temperature protection signal.

Moreover, at a moment when the PWM signal PWM is transited from the high voltage level to the low voltage level, the driver drains the current ILD, and the voltage on the pin GD is correspondingly pulled low.

In summary, by connecting the thermal resistor to the control terminal of the power transistor, and detecting a magnitude of the driving current flowing to the control terminal of the power transistor, a variation status of the environment temperature is determined to generate the over temperature protection signal. In this way, it is unnecessary to use an extra pin to connect the thermal resistor, which avails effectively saving a circuit area and enhancing price competitiveness of the product.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power conversion apparatus, comprising:
a power transistor, coupled to an input voltage, wherein a control terminal of the power transistor receives a control signal, and the power transistor converts the input voltage into an output voltage according to the control signal;
a thermal resistor, connected in series between the control terminal of the power transistor and a reference ground voltage, wherein the thermal resistor has a negative temperature coefficient; and
a temperature detection circuit, coupled to the thermal resistor and the power transistor, and generating the control signal and providing a driving current to the control terminal of the power transistor according to the control signal and the driving current flowing through the thermal resistor, wherein the temperature detection circuit further generates an over temperature protection signal according to the driving current, wherein the temperature detection circuit comprises:
a driver, receiving a pulse width modulation signal, generating the control signal according to the pulse width modulation signal, and providing the driving current to the control terminal of the power transistor according to the control signal;
a current detector, coupled to the driver, and generating a comparison voltage by detecting the driving current; and
a comparator, coupled to the current detector, receiving the comparison voltage, and comparing the comparison voltage with a predetermined threshold voltage to generate the over temperature protection signal,
wherein the driver comprises:
a first transistor, having a first terminal, a second terminal and a control terminal, wherein the first terminal receives an operation voltage, the second terminal is coupled to the control terminal of the power transistor, and the control terminal receives the pulse width modulation signal; and
a second transistor, having a first terminal, a second terminal and a control terminal, wherein the second terminal receives the reference ground voltage, the first terminal is coupled to the control terminal of the power transistor, and the control terminal receives the pulse width modulation signal,
wherein the current detector obtains a detection current according to the driving current flowing through the first transistor, and the current detector converts the detection current to generate the comparison voltage.

2. The power conversion apparatus as claimed in claim 1, wherein the first transistor and the second transistor are not simultaneously turned on.

3. The power conversion apparatus as claimed in claim 1, wherein the current detector comprises:
a transconductance amplifier, having two input terminals respectively coupled to the first terminal and the second terminal of the first transistor, and an output terminal coupled to a terminal of the comparator that receives the comparison voltage; and
a resistor, having a first terminal coupled to the output terminal of the transconductance amplifier and generating the comparison voltage, and a second terminal coupled to the reference ground voltage.

4. The power conversion apparatus as claimed in claim 1, further comprising:
- a transformer, having a first side winding coupled between the first terminal of the power transistor and the input voltage; and
- a rectifier, coupled to the second side winding of the transformer, and rectifying a voltage on the second side winding of the transformer to generate the output voltage.

5. The power conversion apparatus as claimed in claim 4, wherein the rectifier comprises:
- a diode, having an anode coupled to the second side winding of the transformer, and a cathode generating the output voltage; and
- a capacitor, having a first terminal coupled to the cathode of the diode, and another terminal coupled to the reference ground voltage.

\* \* \* \* \*